(12) United States Patent
Ainsworth

(10) Patent No.: US 10,243,392 B2
(45) Date of Patent: Mar. 26, 2019

(54) FABRIC DEVICE FOR CHARGING

(71) Applicant: INTEL CORPORATION, Santa Clara, CA (US)

(72) Inventor: Lucas B. Ainsworth, Palo Alto, CA (US)

(73) Assignee: INTEL CORPORATION, Santa Clara, CA (US)

( * ) Notice: Subject to any disclaimer, the term of this patent is extended or adjusted under 35 U.S.C. 154(b) by 158 days.

(21) Appl. No.: 15/282,560

(22) Filed: Sep. 30, 2016

(65) Prior Publication Data
US 2018/0097393 A1   Apr. 5, 2018

(51) Int. Cl.
*H02J 7/00*   (2006.01)
*H02J 7/02*   (2016.01)
*H02J 50/12*  (2016.01)

(52) U.S. Cl.
CPC .............. *H02J 7/025* (2013.01); *H02J 50/12* (2016.02)

(58) Field of Classification Search
CPC .. D01D 5/0007; D01D 5/0084; D01D 5/0092; D01D 5/0038; D01D 5/24; H01M 4/8673; H01M 4/667; H02J 50/00; H02J 50/10; H02J 50/12; H02J 7/025
USPC ........................................................ 320/108
See application file for complete search history.

(56) References Cited

U.S. PATENT DOCUMENTS

| | | | | |
|---|---|---|---|---|
| 5,906,004 | A | * | 5/1999 | Lebby ................. A41D 31/00 139/425 R |
| 2006/0281382 | A1 | | 12/2006 | Karayianni et al. |
| 2010/0039066 | A1 | | 2/2010 | Yuan et al. |
| 2011/0128686 | A1 | * | 6/2011 | Moreshead ......... D03D 1/0076 361/679.01 |
| 2014/0035523 | A1 | * | 2/2014 | Winget ............... H04B 1/3816 320/108 |
| 2014/0217965 | A1 | | 8/2014 | Van Wiemeersch et al. |
| 2014/0259398 | A1 | * | 9/2014 | Kendall ............ A47G 27/0237 5/420 |
| 2015/0326063 | A1 | | 11/2015 | Leabman et al. |

FOREIGN PATENT DOCUMENTS

KR   10-2013-0080603 A   7/2013

OTHER PUBLICATIONS

International Search Report and Written Opinion dated Oct. 31, 2017 for International Application No. PCT/US2017/049405, 14 pages.

* cited by examiner

*Primary Examiner* — Nghia M Doan
(74) *Attorney, Agent, or Firm* — Schwabe, Williamson & Wyatt, P.C.

(57) ABSTRACT

An electronic device may include a charging pad have a plurality of metal contacts, and a fiber device having a plurality of non-conductive material and a plurality of conductive material. At least one of the plurality of conductive material may be aligned with at least one of the plurality of metal contacts.

20 Claims, 8 Drawing Sheets

FABRIC DEVICE FOR CHARGING

BACKGROUND

1. Field

Embodiments may relate to a fabric device and a charging pad for charging and power delivery.

2. Background

Wireless charging (or wireless power-delivery) may use a power transmitter and a power receiver. A power transmitting device may provide a power transfer or charging mechanism for powering one or more compatible devices via a wire-free power transfer (or wireless power transfer). The power transmitting device may include a charging pad, for example. More than one compatible device may be charged or powered at a same time. The power transmitting device may be connected to a power source, and may provide power to a receiving device (or apparatus) when the device (or apparatus) is provided on the power transmitting device. The device may be an electronic device or a battery powered tool, for example.

BRIEF DESCRIPTION OF THE DRAWINGS

Arrangements and embodiments may be described in detail with reference to the following drawings in which like reference numerals refer to like elements and wherein.

DETAILED DESCRIPTION

Figure 1:
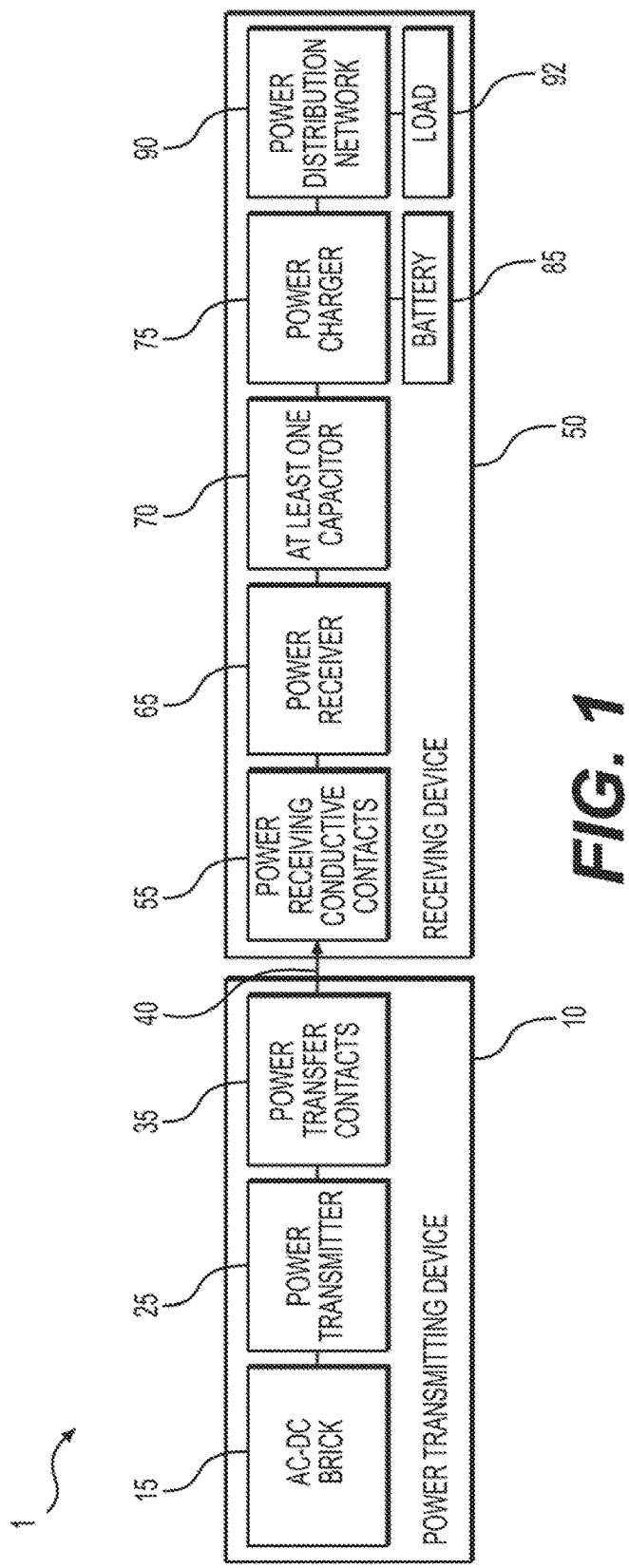
FIG. 1 is a block diagram of a wire-free power transfer system according to an example arrangement.

In the following description, numerous specific details may be set forth. However, it is understood that embodiments may be practiced without these specific details. In other instances, well-known circuits, structures and techniques may not be shown in detail in order to not obscure an understanding of this description.

References to "one embodiment," "an embodiment," "example embodiment," "various embodiments," etc., indicate that embodiments may include particular features, structures, or characteristics, but not every embodiment necessarily includes the particular features, structures, or characteristics. Further, some embodiments may have some, all, or none of the features described for other embodiments. Features from one embodiment (or arrangement) may be combined with features of other embodiments (or arrangements).

Wire-free (or wireless) power transfer may involve a power transmitting device (or charging device) to transfer power to an electronic device or other type of device, for example. For ease of discussion, the following description may relate to providing power to an electronic device (or device). The electronic device (or receiving device) may power any one of a wide variety of battery powered devices including mobile terminals, such as personal digital assistants (PDAs), pagers, mobile televisions, mobile telephones, smartphones, gaming devices, laptop computers, tablet computers, cameras, camera phones, video recorders, audio/video players, radios, global positioning system (GPS) devices, navigation devices, and/or any combination of the aforementioned. The device may be a device that has no battery but that only draws power when placed on (or provided on) a power transmitting device (that includes at least a wire-free charging pad), for example.

The power transmitting device (or charging device) may include a charging pad (or charging mat) and a fabric device. The power transmitting device may also be called an electronic device (or electronic apparatus). The receiving device (or apparatus) may be physically provided on the fabric device (and on the charging pad) in order to receive a power transfer from the charging pad (via the fabric device). For example, the charging pad (or mat) may provide (or deliver) 20 Watts (W) or more of power to the receiving device physically provided on the fabric device (and the charging pad).

Wireless conductive charging (or power-delivery) may include the power transmitting device to have exposed metal contacts (or metal plates) of different polarity, and include the power receiving device to have two or more conductive contacts (or metal contacts) that make electrical contact with conductive contacts of the power transmitting device.

Conductive charging may have advantages over resonant and inductive wireless charging. For example, conductive charging may transfer higher levels of power with superior efficiency, while not emitting magnetic fields. Conductive charging devices may provide physical contact between the power transmitting device and the receiving device with minimum contact resistance.

As a result of the direct conductive contact, the conductive charging devices (such as the power transmitting device) may have limited appearance options, such as appearing similar to an exposed circuit board with a plurality of bare metal contacts (such as metal strips or pads).

Embodiments may relate to a fabric device that may be bonded to a highly conductive sub-layer (such as a charging pad).

FIG. 1 is a block diagram of a wire-free power transfer system according to an example arrangement. Other arrangements and configurations may also be provided.

FIG. 1 shows a wire-free power transfer system 1 that includes two separate devices, namely a power transmitting device 10 and a receiving device 50 (or power receiving device). The wire-free power transfer system 1 is considered wire-free because the power transmitting device 10 is not physically connected by wires to the receiving device 50. Rather, as will be described below, the receiving device 50 may electrically couple to the power transmitting device 10 via conductive contacts (or metal contacts) that a user of the device does not have to manually connect or even think about during a power transfer session. FIG. 1 shows a wire-free transfer power medium 40 being provided from the power transmitting device 10 to the receiving device 50.

As shown in FIG. 1, the power transmitting device 10 may include an alternating current-direct current (AC-DC) brick 15, a power transmitter 25 (or power transmitting device) and power transfer contacts 35. Other components may also be provided. The power transfer contacts 35 may also be called metal contacts or metal strips.

The AC-DC brick 15 may be a power source that receives AC power and provides DC power. As one example, the AC-DC brick may receive AC voltage (110V/60 Hz or 220V/50 Hz) and convert the received AC power into a DC voltage of either 15V or 20 V, for example. Other power sources may also be provided.

The power transmitter 25 may receive the DC power from the AC-DC brick 15, and the power transmitter 25 may provide DC power (or DC-like power) to the power transfer contacts 35. The power transmitter 25 may include a controller (or microcontroller) to control the power provided to the power transfer contacts 35. The power transmitter 25 may include other components, such as a voltage regulator, a driver circuit (or circuits), power transistors, etc. As one example, the controller may control a driver circuit and/or power transistors in order to control the power provided from the AC-DC brick 15 to the power transfer contacts 35.

The power transfer contacts 35 may include a plurality of conductive contacts (or metal contacts) as will be described below. The power transfer contacts 35 may include a plurality of conductive strips and/or a plurality of conductive pads. The power transfer contacts 35 may be provided on (or at) a charging pad or charging mat.

As shown in FIG. 1, the receiving device 50 may include power receiving conductive contacts 55 (or conductive contacts), a power receiver 65 (or power receiver device), at least one capacitor 70 (or capacitors), a power charger 75, a battery 85, a power distribution network 90 and a load 92. The conductive contacts may also be called metal contacts. Other components (or less components) may also be provided.

In at least one arrangement, the capacitor (or capacitor devices) may supply temporary power to the power charger 75 and/or the power distribution network 90 when power is not received from the power transmitting device 10 (via the wire-free power transfer).

The power receiving conductive contacts 55 may include a plurality of contacts at a bottom surface (or rear surface) of the receiving device 50, for example. The plurality of contacts may be geometrically positioned on the receiving device 50 to contact two (at a minimum) of the power transmitting contacts 35 (or metal contacts) of the power transmitting device 10 when the receiving device 50 is physically provided on the power transmitting device 10.

Based on a position of the receiving device 50 relative to the power transmitting device 10, the power receiving conductive contacts 55 (or metal contacts) may physically contact the power transfer contacts 35 (of the power transmitting device 10). When the power receiving conductive contacts 55 (of the receiving device 50) physically contact the power transfer contacts 35 (of the power transmitting device 10), then the controller of the power transmitter 25 may provide a power transfer (at the power transfer medium 40) from the power transfer contacts 35 (of the power transmitting device 10) to the power receiving conductive contacts 55 (of the receiving device 50).

The power receiver 65 may receive power from the power receiving conductive contacts 55 and provide power to the at least one capacitor 70, the power charger 75 and/or the power distribution network 90. The power receiver 65 may include a bridge rectifier and a voltage regulator, for example, to properly regulate the power. The power charger 75 may store the received power in the battery 85, for example. The receiving device 50 may include at least one capacitor 70 (or a voltage holding capacitor) between the power receiver 65 and the power charger 75 to maintain a usable voltage to the power charger 75 when power to the power receiver 65 is cut (or disconnected from the power transmitting device 10) during a test time duration (or test time period).

Figure 2A:
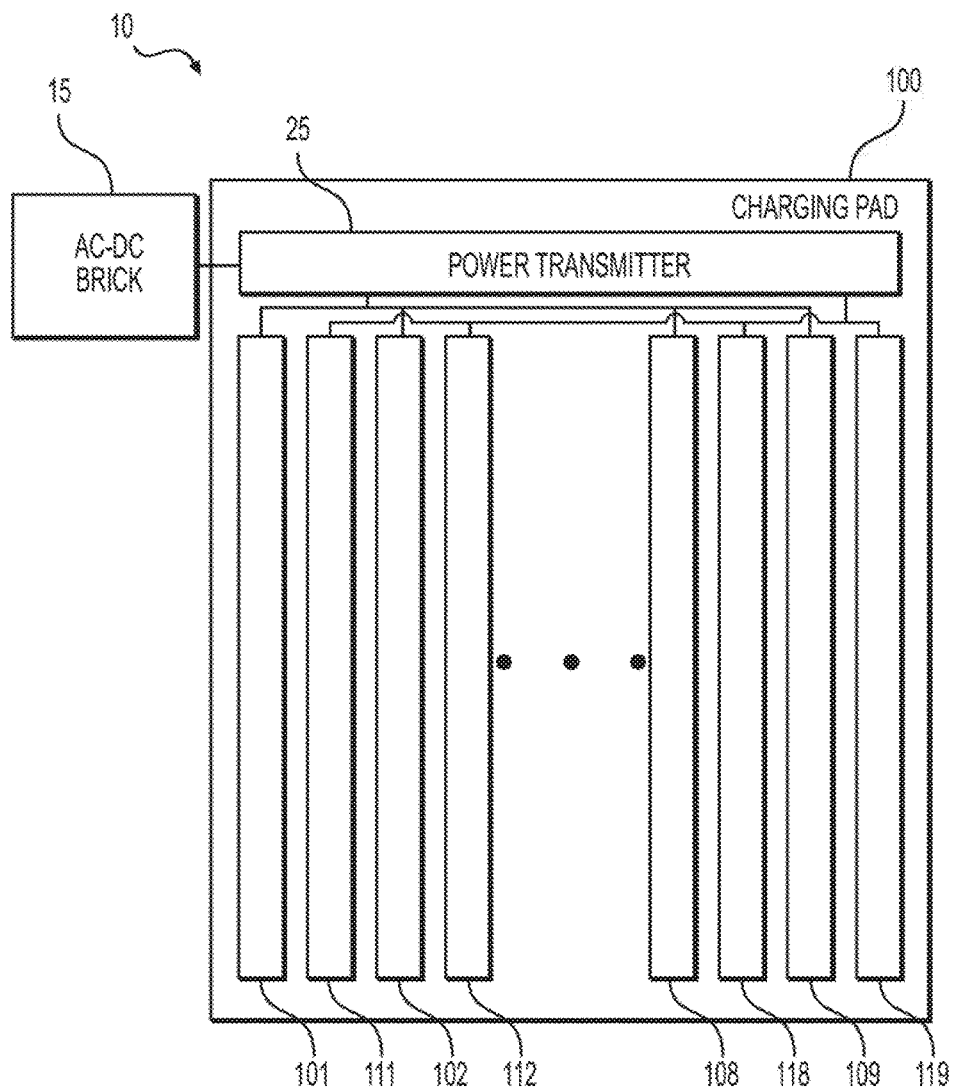
FIG. 2A shows a power transmitting device according to an example arrangement.

FIG. 2A shows a power transmitting device according to an example arrangement. Other arrangements and configurations may also be provided. The power transmitting device may primarily include a charging pad.

More specifically, FIG. 2A shows a plurality of conductive contacts (or metal contacts) corresponding to the power transfer contacts 35 (shown in FIG. 1). FIG. 2A also shows the power transmitter 25. The power transfer contacts (or metal contacts) and the power transmitter may be provided on (or at) a charging pad 100 (or charging mat). In at least one arrangement, the charging pad 100 may be electrically coupled to the AC-DC brick 15.

The power transmitter 25 may provide a positive DC voltage to specific ones of the power transfer contacts (or metal contacts), and the power transmitter 25 may provide a reference GROUND to other specific ones of the power transfer contacts (or metal contacts). The power transfer contacts (or metal contacts) that receive a positive voltage may hereafter be referred to as positive contacts, and the power transfer contacts (or metal contacts) that receive the reference ground may hereafter be referred to as ground contacts. In at least one arrangement, the ground contact may be coupled to a ground system of the power transmitter 25. Current sensing circuitry may be provided between the transmitter ground and the ground contact. In at least one arrangement, the metal contacts may include a positive contact and a negative contact (rather than a ground contact).

The power transfer contacts at the charging pad 100 may include a plurality of parallel power transfer contacts (or metal contacts), as shown in FIG. 2A. Each of the plurality of parallel conductive contacts may be considered either a positive contact or a ground contact. The positive contacts and the ground contacts may be alternatively arranged at the charging pad 100. For example, metal contacts 101, 102, . . . , 108 and 109 (or power transfer contacts) may be considered the positive contacts (or first set of power transfer contacts) that receive a positive voltage from the power transmitter 25, and metal contacts 111, 112, . . . , 118 and 119 (or power transfer contacts) may be considered the ground contacts (or second set of power transfer contacts) that receive the reference ground from the power transmitter 25. The positive and ground contacts at the power transmitting device 10 (or charging pad 100) may be alternatively arranged in accordance with the objective of the power transfer system.

In at least one arrangement, the receiving device 50 may include a plurality of power receiving conductive contacts 55 on a bottom surface (or rear surface) of the receiving device 50. The plurality of power receiving conductive contacts 55 may be specifically arranged on the bottom surface such that at least two of the conductive contacts (of the receiving device 50) physically contact at least two of the metal contacts (or power transfer contacts) of the power transmitting device 10. At least two of the conductive contacts 55 of the receiving device 50 are geometrically arranged on the receiving device 50 to physically contact at least one of the positive contacts (at the charging pad 100) and at least one of the ground contacts (at the charging pad 100) regardless of orientation of the receiving device 50 provided on the charging pad 100 (i.e., any one of 0 to 360 degrees) such that a circuit is created and electricity flows.

The arrangement of the plurality of metal contacts (or power transfer contacts) on the charging pad 100 allows a plurality of electronic devices to charge at a same time on the charging pad 100. The charging pad (or device) may therefore be large in size.

Figure 2B:
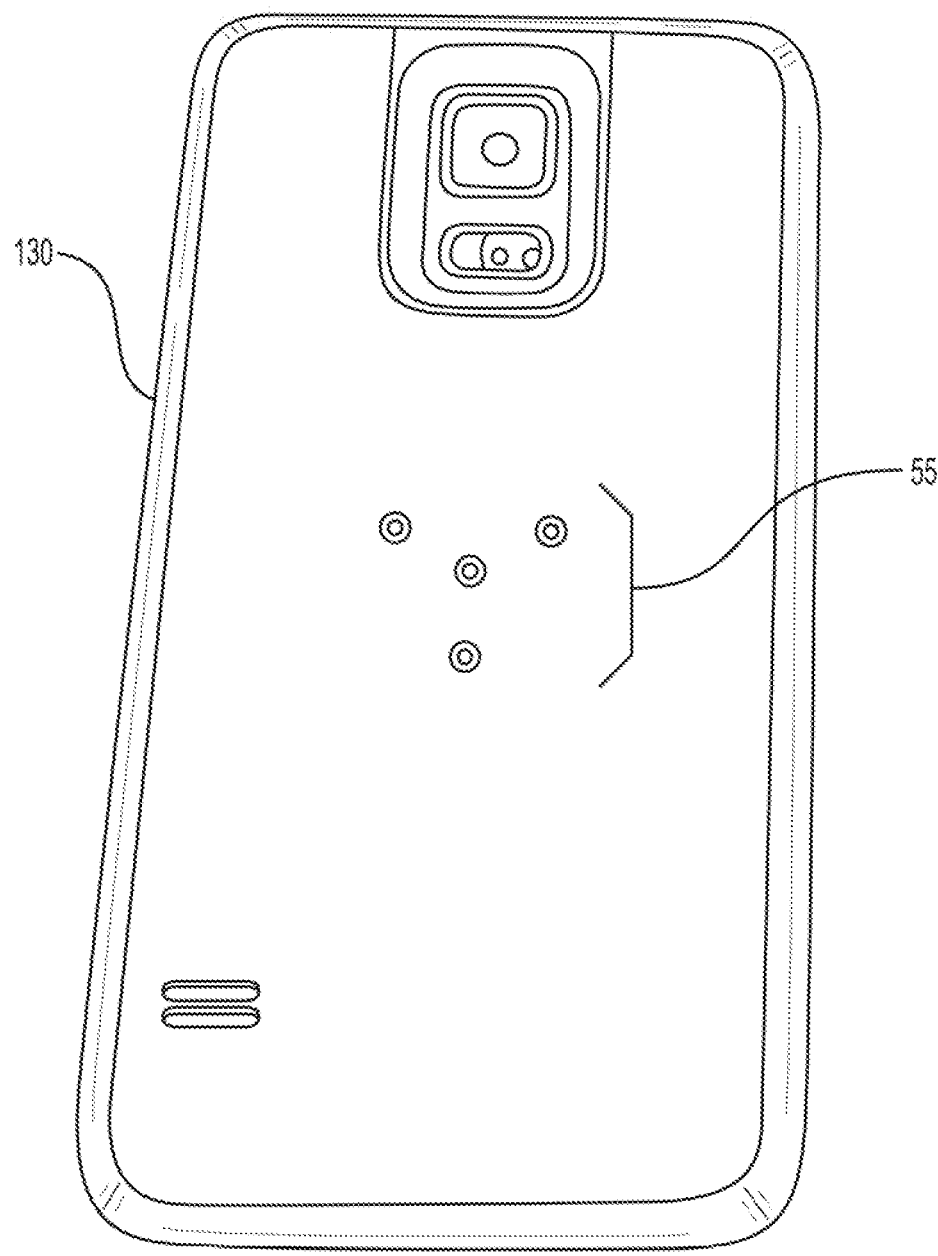
FIG. 2B shows conductive contacts on a rear surface of a receiving device according to an example embodiment.

FIG. 2B shows a rear surface of a receiving device according to an example embodiment. Other embodiments and configurations may also be provided.

More specifically, FIG. 2B shows the conductive contacts 55 on the bottom surface (or rear surface) of a terminal 130 (i.e., the receiving device). The conductive contacts 55 are specifically arranged and oriented to make specific contact with metal contacts of the power transmitting device. The conductive contacts 55 may physically contact the metal contacts (or power transfer contacts) of the power transmitting device when the terminal 130 (receiving device) is physically provided on the power transmitting device. FIG. 2B shows four (4) separate conductive contacts 55 (or metal contacts) on the bottom surface of the terminal 130. Other numbers of conductive contacts may also be provided.

Embodiments may include a power transmitting device that includes a fabric device and a charging pad. The fabric device may be provided between the charging pad and the receiving device. The fabric device may provide an electrical connection (or electrical path) between conductive contacts on the receiving device and metal contacts (or power transfer contacts) on the charging pad. This may allow a power transfer from the charging pad to the receiving device.

The fabric device may include a fabric (or textile) that includes a plurality of non-conductive material and a plurality of conductive material. The plurality of non-conductive material may include a plurality of non-conductive threads (such as cotton). The plurality of conductive material may include a plurality of conductive threads (such as copper).

Each of the conductive threads may be separately arranged on the fabric device to correspond to a specific metal contact of the charging pad when the fabric device is physically provided on the charging pad. The conductive materials on the fabric device are specifically positioned so as to contact specific ones of the plurality of metal contacts of the charging pad when the fabric device is physically provided on the charging pad. The fabric device may be physically provided on the charging pad by a bonding process, for example The specific placement allows a proper electrical connection between metal contacts (on the charging pad) and conductive contacts (on the receiving device).

The conductive threads may provide an electrical connection between a top surface of the fabric device and a bottom surface of the fabric device (such as the metal contacts of the charging pad). This may allow a receiving device (such as shown in FIG. 2A) to be powered by the fabric device (and the charging pad).

Figure 3:
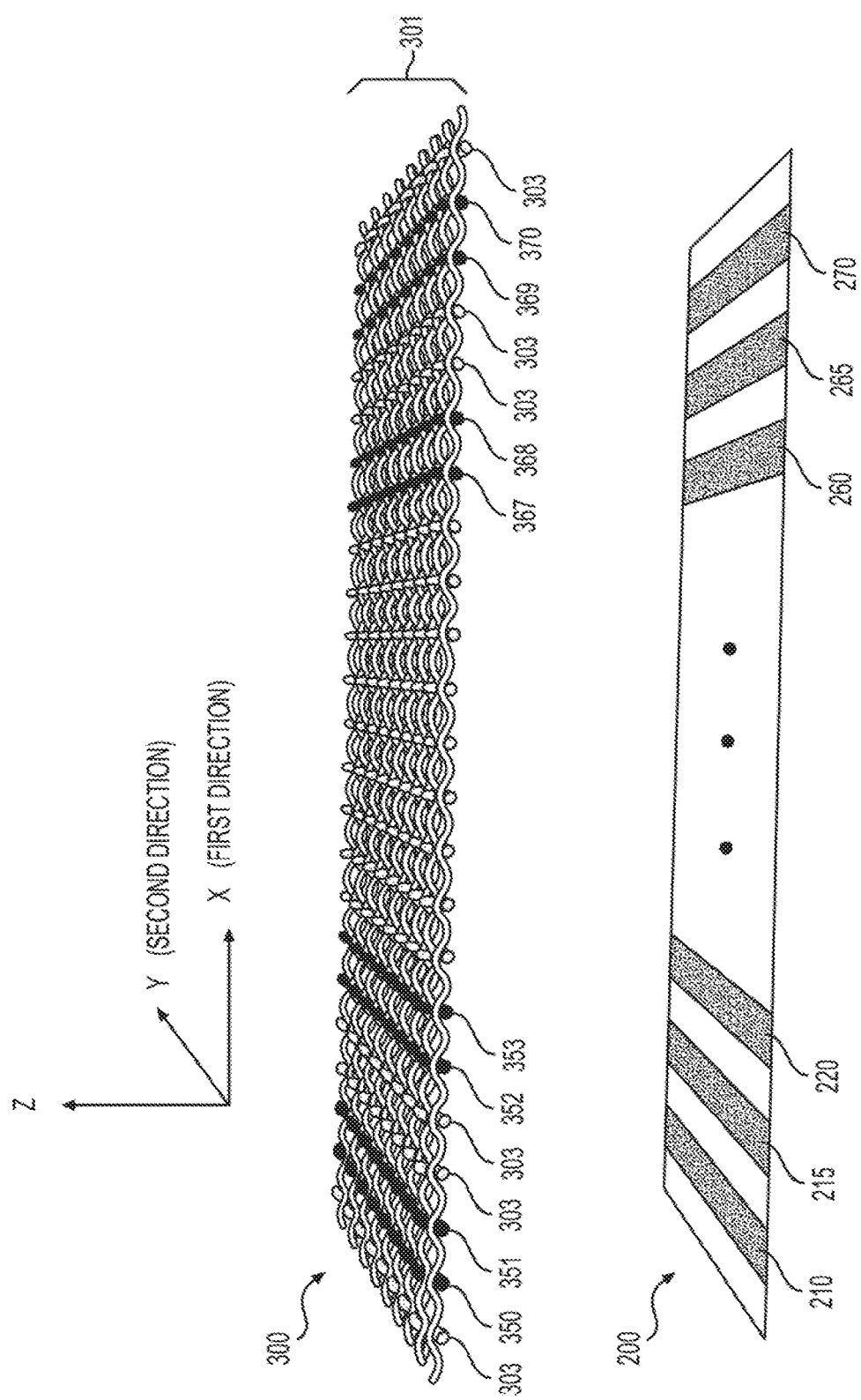
FIG. 3 shows a power transmitting device in a separated manner according to an example embodiment.

FIG. 3 shows a power transmitting device in a separated manner according to an example embodiment. Other embodiments and configurations may also be provided.

More specifically, FIG. 3 shows a charging pad 200 separated from a fabric device 300. This drawing is shown with the components separated from each other for mere ease of description.

The charging pad 200 may correspond to the charging pad 100 shown and described above with respect to FIG. 2A. The charging pad 200 may also be called a sub-surface. The charging pad 200 may include a plurality of metal contacts (including positive contacts and ground contacts). The metal contacts may correspond to the power transfer contacts discussed above with respect to the FIGS. 1 and 2A. The plurality of metal contacts may be provided on a substrate, for example. Each of the plurality of metal contacts may extend in a second direction (aligned with respect to a Y direction).

FIG. 3 shows a plurality of positive contacts 210, 220, . . . 260, 270 and a plurality of ground contacts 215, . . . 265. The positive contacts and ground contacts are collectively referred to as metal contacts. Each of the metal contacts may be physically separated (in a first direction) from adjacent ones of the metal contacts. FIG. 3 only shows a small number of metal contacts for ease of description. Other numbers of metal contacts may also be provided.

Although not shown in FIG. 3, the positive contacts may be coupled to a power transmitter (such as the power transmitter 25 shown in FIG. 2A) to receive a positive voltage, and the ground contacts may be coupled to the power transmitter (such as the power transmitter 25 shown in FIG. 2A) to receive a ground voltage. In at least another arrangement, a negative voltage may be applied to specific ones of the contacts (i.e., negative contacts).

The fabric device 300 may include a plurality of non-conductive material and a plurality of conductive material. The fabric device 300 may include fabric or textile that includes non-conductive material that may be woven using a traditional technique.

The non-conductive material of the fabric device 300 may include cotton and/or cotton threads, for example, that extend in either a first direction (corresponding to the X-direction) or a second direction (corresponding to the Y-direction). The threads may be considered to be woven in an X-direction or in a Y-direction The non-conductive material may include a plurality of first non-conductive threads 301 extending in the first direction (in the X-direction) and a plurality of second non-conductive threads 303 extending in the second direction (in the Y-direction). For ease of view, FIG. 3 only labels a few of the first non-conductive threads 301 (extending in the first direction), and only labels a few of the second non-conductive threads 303 (extending in the second direction).

In at least one embodiment, the conductive material of the fabric device 300 may include conductive threads (or metal threads) that are separately woven in between different ones of the non-conductive threads. In at least one embodiment, the conductive threads may be woven in between non-conductive threads by a traditional fabric manufacturer process. The metal threads extend in the second direction (in the Y-direction). This allows the metal threads to physically align with the metal contacts of the charging pad. However, the conductive threads (or metal threads to not extend in the first direction (i.e., the X-direction).

As one example, the metal or metal threads (i.e., the conductive threads) may be copper, copper threads, and/or copper wire. The copper wires may include tinned copper wire. Threads or wire threads may be individual or stranded wires pre-wound or woven from finer wire sub-strands.

The conductive material may include a plurality of conductive threads 350, 351, 352, 353, . . . , 367, 368, 369, 370 that each extend in the second direction (in the Y-direction). In FIG. 3, the conductive threads are shown to be darker that the non-conductive thread merely to visually distinguish the conductive threads from the non-conductive threads in this figure. However, in actual use, the conductive threads may be a same darkness (or a different darkness) as compared to the non-conductive threads. The plurality of conductive threads are parallel conductive threads. As one example, a conductive thread may be woven between non-conductive threads and may cross from a top surface of the fabric device to a bottom surface of the fabric device (in a woven manner) without contacting another conductive thread. Other conductive threads may be similarly arranged. Based on the specific arrangement of the conductive threads, the fabric device 300 may be electrically conductive in the Z-direction and in the Y-direction (for example) without being conductive in the X-direction.

Figure 4:
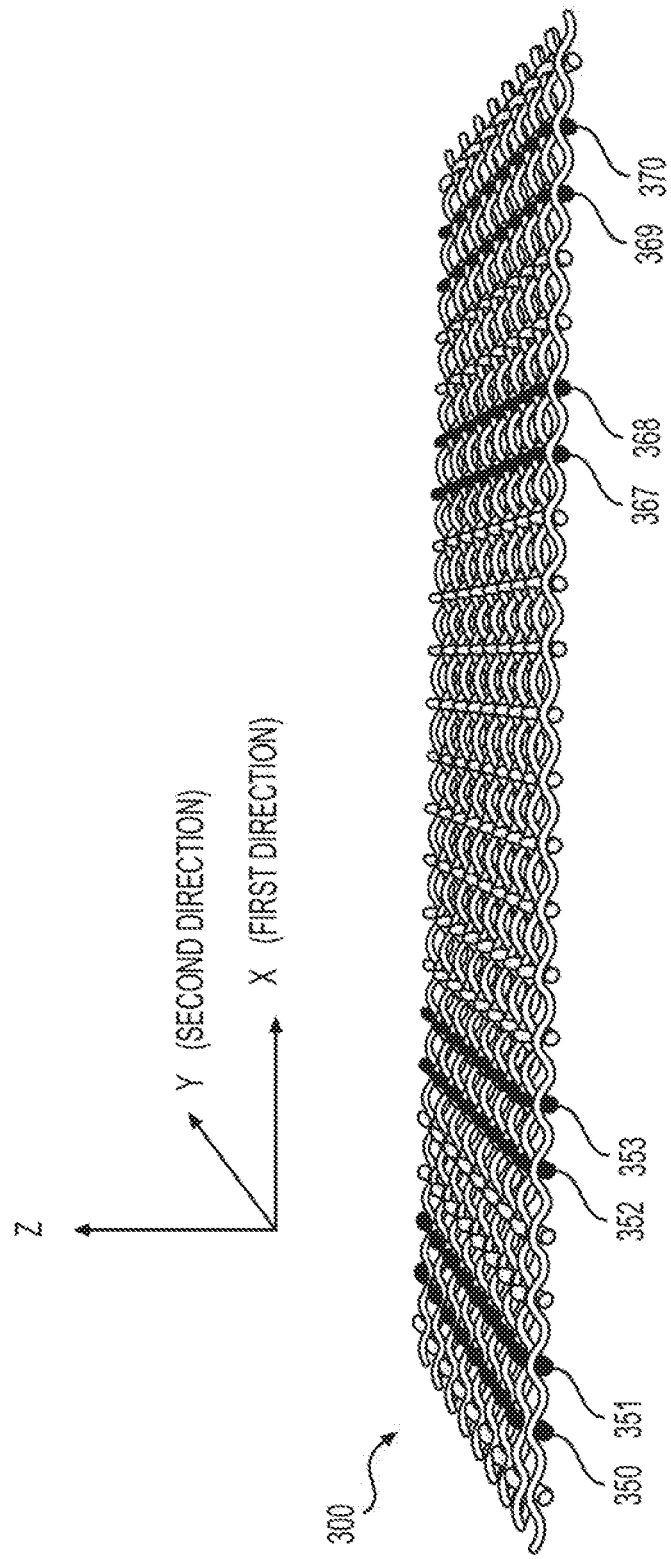
FIG. 4 shows a fabric device according to an example embodiment.

FIG. 4 shows a fabric device according to an example embodiment. Other embodiments and configurations may also be provided.

FIG. 4 shows the fabric device 300 that includes the non-conductive material and the conductive material. More specifically, FIG. 4 shows a plurality of conductive material that extend in the second direction (i.e. in the Y-direction). For example, the plurality of conductive materials may include the plurality of conductive threads 350, 351, 352, 353 . . . , 367, 368, 369, 370 that each separately extend in the second direction (in the Y-direction). The conductive threads correspond to the metal contacts of the charging pad (that also extend in the second direction).

As one example, the conductive thread 350 may be woven with respect to the non-conductive threads. For example, the conductive thread 350 may be provided into openings between the other ones of the non-conductive material such that the conductive thread 350 extends from a top surface of the fabric device 300 to a bottom surface of the fabric device 300 (i.e., in a third direction or Z-direction). The conductive thread 350 may correspond to a specific one of the metal contacts on the charging pad 200. For example, the conductive thread 350 may be provided to correspond to a position over the metal contact 210 as shown in FIG. 3 (when the fabric device 300 is provided on the charging pad 200), and portions of the conductive thread 350 may physically contact the metal contact 210. In other words, the portions of the conductive thread 350 that are at the bottom surface of the fabric device may physically contact the corresponding metal contact 210.

Each of the other conductive threads may be arranged in a similar manner. Each of the other conductive threads may be associated with a specific one of the metal contacts of the charging pad 200. Each of the conductive threads extends in the second direction, and each of the metal contacts of the charging pad 200 extends in the second direction.

For example (and as shown in FIG. 3), the conductive threads 350, 351 may be associated with the metal contact 210, the conductive threads 352, 353 may be associated with ground contact 215, the conductive threads 367, 368 may be associated with the ground contact 265, and the conductive threads 369, 370 may be associated with the metal contact 270. Portions of the conductive threads 350, 351 at a bottom surface of the fabric device may physically contact the metal contact 210 (when the fabric device 300 is provided on the charging pad 200), portions of the conductive threads 352, 353 at the bottom surface of the fabric device may physically contact the ground contact 215, portions of the conductive threads 367, 368 at a bottom surface of the fabric device may physically contact the metal contact 265, and portions of the conductive threads 369, 370 at a bottom surface of the fabric device may physically contact the metal contact 270 (when the fabric device 300 is provided on the charging pad 200).

The fabric device 300 is provided such that the receiving device (such as shown in FIG. 2B) may be physically provided on a top surface of the fabric device 300. More specifically, the conductive contacts (or metal contacts) of the receiving device may contact the top surface of the fabric device 300. The conductive contacts may physically contact different ones of the conductive threads of the fabric device 300. This provides a physical electrical connection from the conductive contacts (of the receiving device) to the conductive threads and to specific ones of the metal contacts of the charging pad that match the conductive threads. The charging pad may provide power transfer to the receiving device (via the fabric device).

Figure 5:
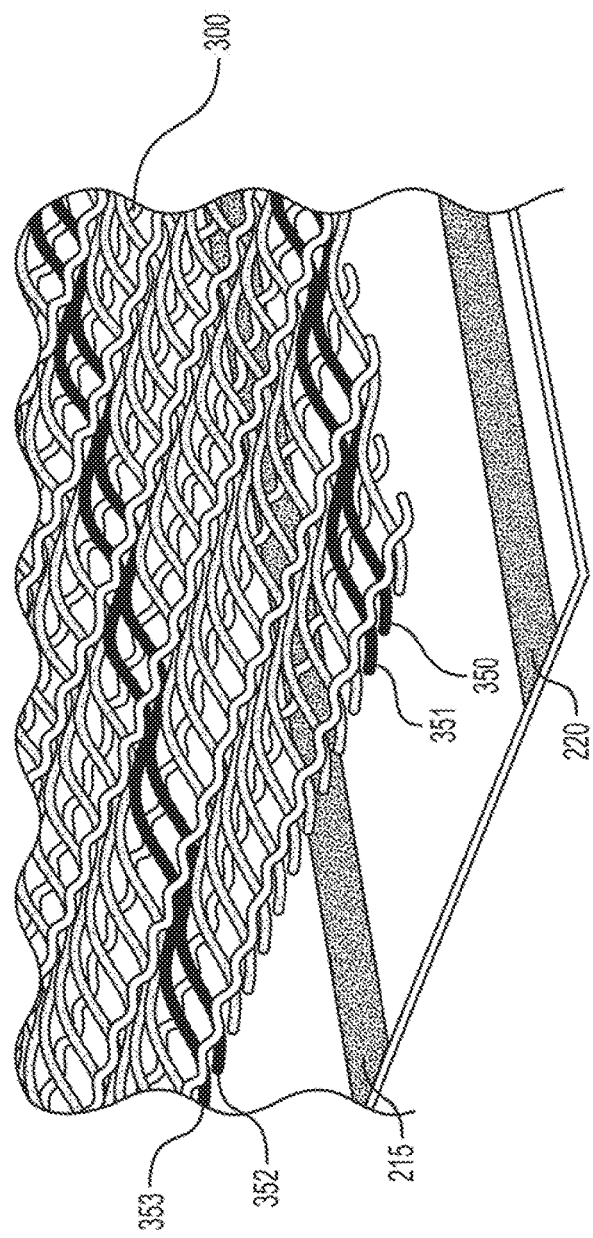
FIG. 5 is a close up view of a fabric device and a charging pad in a separated manner according to an example embodiment.
Figure 6:
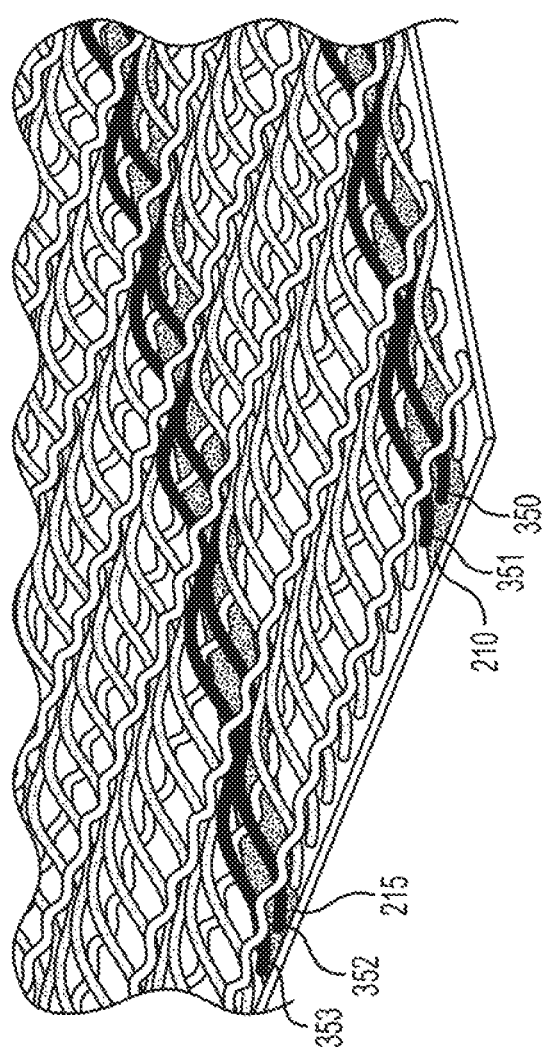
FIG. 6 is a close up view of a fabric device and a charging pad in a bonded manner according to an example embodiment.

FIG. 5 is a close up view of the fabric device and the charging pad in a separated manner according to an example embodiment. FIG. 6 is a close up view of the fabric device and the charging pad in a bonded manner according to an example embodiment. Other embodiments and configurations may also be provided.

More specifically, FIG. 5 shows the fabric device 300 is positioned over the charging device 200 such that specific ones of the conductive threads are aligned over the first metal contact 210 and the other specific ones of the conductive threads are aligned over the second metal contacts 220. For example, the conductive threads 350, 351 are aligned over metal contacts 210, and the conductive threads 352, 353 are aligned over the metal contact 215.

FIG. 5 shows the fabric device 300 spaced apart from the charging pad 200. However, during manufacture, the fabric device 300 may be physically coupled to the charging pad 200 such that the fabric device 300 and the charging pad 200 are physically coupled together as the power transmitting device.

For example, the fabric device 300 may be bonded to the charging pad 200 by a solder paste. After solder paste is provided between the charging pad 200 and the fabric device 300, the components may be heated in an oven. This may result in a bonding. Other types of electrical bonding may also be used.

It at least one embodiment, the solder paste is provided at an area above each of the metal contacts of the charging pad so as to have a proper electrical connection.

In at least one embodiment, all or most of the threads extending in the Y direction may be conductive threads. In this example, certain ones of the conductive threads will be electrically connected to one metal contact (via the conductive solder paste) and other certain ones of the conductive threads will be electrically connected to the one metal contact (via the conductive solder paste).

The solder paste may have many formulations and may have a melting point starting at as low as 120 degrees F. Paste may be selected that melts at the highest melting point that will not damage the non-conductive fibers. Other bonding methods may include conductive epoxy, or other conductive adhesives that may be formulated for high flexibility. The bonding method may be selected based on intended use of final product, environmental impact, cost, etc. FIG. 6 shows the conductive threads 350, 351 are contacting the metal contact 210, and the conductive threads 352, 353 are contacting the metal contact 215

Figure 7:
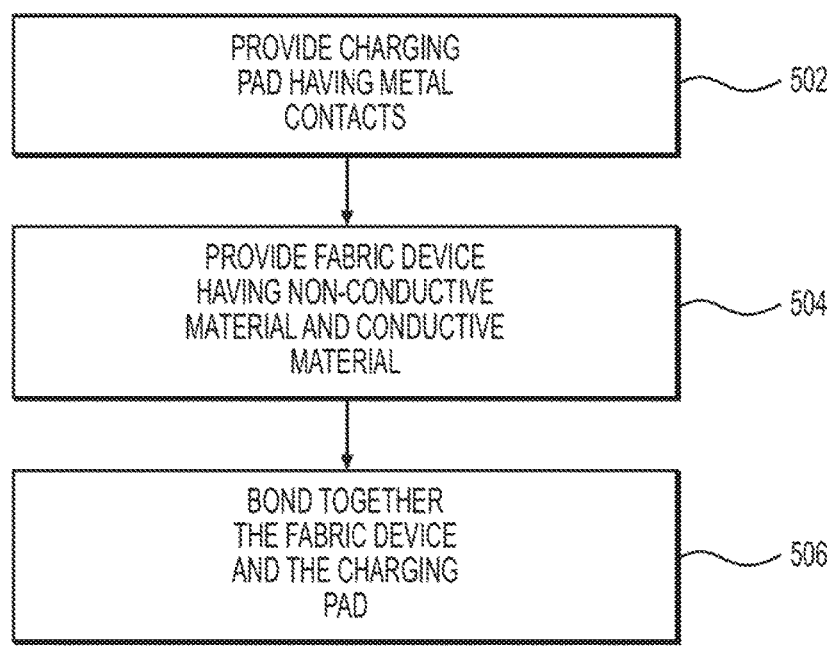
FIG. 7 is a flow chart showing a method of providing a power transmitting device according to an example embodiment.

FIG. 7 is a flow chart showing a method of providing a power transmitting device according to an example embodiment. Other embodiments and configurations may also be provided.

More specifically, FIG. 7 shows different operations for providing a power transmitting device. The order of operations shown in FIG. 7 is merely one example, as other orders may also be provided.

In operation 502, a charging pad may be provided having metal contacts. The charging pad may correspond to the charging pad (FIG. 2A) or to the charging pad 200, for example.

In operation 504, a fabric device may be provided. The fabric device may correspond to the fabric device 300. As discussed above, the fabric device may include a plurality of non-conductive material and a plurality of conductive material. The plurality of conductive material may include a plurality of conductive threads each extending in the second direction (in the Y-direction) and such that the conductive threads are parallel with respect to each other. The conductive threads may be woven such that portions of one conductive thread may extend from a top surface of the fabric device to a bottom surface of the fabric device.

In operation 506, the fabric device and the charging pad may be bonded together. As discussed above, the fabric device may be bonded to the charging pad such that portions of the conductive threads physically contact specific ones of the metal contacts (of the charging pad). For example, solder paste may be provided between one metal contact and at least one conductive contact (of the fiber device) and solder past may be provided between one metal contact and at least one conductive contact (of the fiber device).

The above operation may result in a power transmitting device that includes a charging pad and a fabric device (having conductive threads). The conductive threads of the fabric device may correspond to metal contacts of the charging pad.

Embodiments may relate to a method of manufacturing a conductive charging fabric (or textile) that may be used on charging pads (or mats) or an inside lining of a laptop bag, for example.

The charging pad (or charging mat) may include a conductive charging sub-surface formed in same dimensions as an intended final charging surface. The conductive charging sub-surface may be made of flexible or rigid material, and may have highly conductive (such as copper) metal contacts (or charging traces) that are parallel to each other and are a same size as a size of the intended final charging strips size.

The fabric device may be provided on a top of the sub-surface such that the conductive threads are aligned in parallel with the metal contacts (or metal strips). Solder paste (or similar highly conductive bonding material) may be applied to the sub-surface metal contacts (or metal traces), and the two layers may be pressed together and bonded in an oven, for example, so that the sub-surface metallic contacts (or metal traces) traces join with the conductive thread on the bottom surface of the fabric.

Embodiments may provide a short conductive path from any point on the top surface of the fabric device down to the highly-conductive sub-surface traces below the fabric device. Because the fabric device is only conductive along the Y-axis or the X-axis, regions of fabric that are not directly above a metal contact (trace) on the sub-surface are isolated.

Wireless charging fabric devices (such as textile pockets) may be provided into clothing, for example. That is, the conductive charging as described above does not require coils or circuitry built in immediate proximity to the charging surface.

Wireless charging fabric devices (such as textile charging pads) may be provided into armrests of chairs, for example.

Embodiments may operate using the Open Dots™ Alliance standard for cross-compatibility with other conductive charging product. This standard is published on http://opendotsalliance.org/.

The following examples pertain to further embodiments.

Example 1 is an electronic device comprising: a charging pad having a plurality of metal contacts, and a fiber device having a plurality of non-conductive material and a plurality of conductive material, and at least one of the plurality of conductive material is aligned with at least one of the plurality of metal contacts.

In Example 2, the subject matter of Example 1 can optionally include the conductive material includes a plurality of conductive threads.

In Example 3, the subject matter of any one of Examples 1-2 can optionally include each of plurality of conductive threads is arranged in a first direction.

In Example 4, the subject matter of any one of Examples 1-2 can optionally include at least one of the conductive threads includes a first portion at a top surface of the fiber device and a second portion at a bottom surface of the fiber device.

In Example 5, the subject matter of any one of Examples 1-4 can optionally include the second portion of the at least one of the conductive threads contacts the at least one of the metal contacts.

In Example 6, the subject matter of Example 1 can optionally include solder material between the charging pad and the fiber device.

In Example 7, the subject matter of any one of Examples 1-6 can optionally include the solder material includes solder paste.

In Example 8, the subject matter of Example 1 can optionally include a power source to provide power to the metal contacts.

In Example 9, the subject matter of Example 1 can optionally include the conductive material includes copper.

In Example 10, the subject matter of Example 1 can optionally include the at least one of the metal contacts to provide power transfer from the power transmitting device to an external device.

In Example 11, the subject matter of Example 1 can optionally include the metal contacts include positive contacts and ground contacts.

In Example 12, the subject matter of Example 1 can optionally include the electronic device is a power transmitting device.

Example 13 is an electronic device comprising: a charging pad have a plurality of metal contacts that extend in a first direction; and a fiber device having a plurality of non-conductive material and a plurality of conductive material that extend in the first direction, and a first portion of at least one of the plurality of conductive material contacts at least one of the plurality of metal contacts.

In Example 14, the subject matter of Example 13 can optionally include the conductive material includes a plurality of conductive threads.

In Example 15, the subject matter of any one of Examples 13-14 can optionally include each of plurality of conductive threads is arranged in the first direction.

In Example 16, the subject matter of any one of Examples 13-14 can optionally include at least one of the conductive threads includes a second portion at a top surface of the fiber device and the second portion at a bottom surface of the fiber device.

In Example 17, the subject matter of Example 13 can optionally include solder material between the charging pad and the fiber device.

In Example 18, the subject matter of any one of Examples 13-17 can optionally include the solder material includes solder paste.

In Example 19, the subject matter of Example 13 can optionally include a power source to provide power to the metal contacts.

In Example 20, the subject matter of Example 13 can optionally include the conductive material includes copper.

In Example 21, the subject matter of Example 13 can optionally include the at least one of the metal contacts to provide power transfer from the power transmitting device to an external device.

In Example 22, the subject matter of Example 13 can optionally include the metal contacts include positive contacts and ground contacts.

In Example 23, the subject matter of Example 13 can optionally include the electronic device is a power transmitting device.

Example 24 is an electronic system comprising: charging means for providing power to a plurality of metal contacts; and fiber means for receiving power from the charging means for providing power to a receiving device, wherein the fiber means includes a plurality of non-conductive material and a plurality of conductive material, and at least one of the plurality of conductive material is aligned with at least one of the plurality of metal contacts.

In Example 25, the subject matter of Example 24 can optionally include the conductive material includes a plurality of conductive threads.

In Example 26, the subject matter of any one of Examples 24-25 can optionally include each of plurality of conductive threads is arranged in a first direction.

In Example 27, the subject matter of any one of Examples 24-25 can optionally include, wherein at least one of the conductive threads includes a first portion to contact the receiving device and a second power to contact at least one of the metal contacts.

In Example 28, the subject matter of Example 24 can optionally include conductive connection means for connecting between the charging means and the fiber means.

In Example 29, the subject matter of any one of Examples 24-28 can optionally include the conductive connection means includes solder paste.

In Example 30, the subject matter of Example 24 can optionally include power means for providing power to the metal contacts.

In Example 31, the subject matter of Example 24 can optionally include the conductive material includes copper.

In Example 32, the subject matter of Example 24 can optionally include the at least one of the metal contacts to provide power transfer from the power transmitting device to an external device.

In Example 33, the subject matter of Example 24 can optionally include the metal contacts include positive contacts and ground contacts.

In Example 34, the subject matter of Example 24 can optionally include the electronic device is a power transmitting device.

Example 35 is an electronic system comprising: a power transmitting device to provide power, the power transmitting device including a charging pad have a plurality of metal contacts, and a fiber device having a plurality of non-conductive material and a plurality of conductive material, and at least one of the plurality of conductive material is aligned with at least one of the plurality of metal contacts; and a receiving device to receive power from the conductive material when the receiving device is on the fiber device.

In Example 36, the subject matter of Example 35 can optionally include the conductive material includes a plurality of conductive threads.

In Example 37, the subject matter of any one of Examples 35-36 can optionally include each of plurality of conductive threads is arranged in a first direction.

In Example 38, the subject matter of Example 35 can optionally include at least one of the conductive threads includes a first portion at a top surface of the fiber device and a second portion at a bottom surface of the fiber device.

In Example 39, the subject matter of any one of Examples 35-38 can optionally include the second portion of the at least one of the conductive threads contacts the at least one of the metal contacts.

In Example 40, the subject matter of Example 35 can optionally include solder material between the charging pad and the fiber device.

In Example 41, the subject matter of any one of Examples 35-40 can optionally include the solder material includes solder paste.

In Example 42, the subject matter of Example 35 can optionally include a power source to provide power to the metal contacts.

In Example 43, the subject matter of Example 35 can optionally include the conductive material includes copper.

In Example 44, the subject matter of Example 35 can optionally include the at least one of the metal contacts to provide power transfer from the power transmitting device to an external device.

In Example 45, the subject matter of Example 35 can optionally include the metal contacts include positive contacts and ground contacts.

Example 46 is a method of providing an electronic device, comprising: providing a charging pad having a plurality of metal contacts; providing a fabric device having a plurality of non-conductive material and a plurality of conductive material, and at least one of the plurality of conductive material is aligned with at least one of the plurality of metal contacts; and providing the fabric device on the charging pad.

In Example 47, the subject matter of Example 46 can optionally include providing solder material between the metal contacts and the conductive materials.

In Example 48, the subject matter of any one of Examples 46-47 can optionally include heating the solder material such that the fiber device is bonded to the charging device.

In Example 49, the subject matter of Example 46 can optionally include the conductive material includes a plurality of conductive threads.

In Example 50, the subject matter of any one of Examples 46-49 can optionally include each of plurality of conductive threads is arranged in a first direction.

In Example 51, the subject matter of Example 46 can optionally include receiving the wherein at least one of the conductive threads includes a first portion at a top surface of the fiber device and a second portion at a bottom surface of the fiber device.

In Example 52, the subject matter of any one of Examples 46-51 can optionally include the second portion of the at least one of the conductive threads contacts the at least one of the metal contacts.

In Example 53, the subject matter of any one of Examples 46-48 can optionally include the solder material includes solder paste.

In Example 54, the subject matter of Example 46 can optionally include receiving a receiving device on the fiber device.

In Example 55, the subject matter of any one of Examples 46-54 can optionally include receiving power, from a power source, to provide power to the metal contacts.

In Example 57, the subject matter of Example 46 can optionally include the conductive material includes copper.

In Example 58, the subject matter of Example 46 can optionally include the at least one of the metal contacts to provide power transfer from the power transmitting device to an external device.

In Example 59, the subject matter of Example 46 can optionally include the metal contacts include positive contacts and ground contacts.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electronic device comprising:
   a charging pad having a plurality of metal contacts; and
   a fiber device having a plurality of non-conductive threads and a plurality of conductive threads, wherein the plurality of non-conductive threads and the plurality of conductive threads are weaved to form a fabric, and wherein at least one of the plurality of conductive threads is electrically coupled to at least one of the plurality of metal contacts via a solder joint.

2. The electronic device of claim 1, wherein each of the plurality of conductive threads are arranged in a first direction, and wherein each of the plurality of metal contacts are arranged in the first direction.

3. The electronic device of claim 1, wherein the at least one of the plurality of conductive threads has a first portion of the at least one of the conductive threads located at a top surface of the fiber device and a second portion of the at least one of the plurality of conductive threads located at a bottom surface of the fiber device.

4. The electronic device of claim 3, wherein the second portion of the at least one of the conductive threads is electrically coupled to the at least one of the metal contacts via the solder joint.

5. The electronic device of claim 1, wherein the solder joint includes solder paste.

6. The electronic device of claim 1, further comprising a power source, the power source electrically coupled to at least a portion of the plurality of metal contacts.

7. The electronic device of claim 1, wherein each of the plurality of metal contacts are located parallel to others of the plurality of metal contacts.

8. The electronic device of claim 1, wherein the at least one of the plurality of conductive threads includes a first conductive thread of the plurality of conductive threads, wherein the at least one of the plurality of metal contacts includes a first metal contact, wherein the solder joint is a first solder joint, wherein the first metal contact is electrically coupled to a positive voltage source of the electronic device, wherein a second metal contact of the plurality of metal contacts is electrically coupled to a ground source of the electronic device, wherein the second metal contact is located adjacent to the first metal contact in an arrangement of the plurality of metal contacts, and wherein a second conductive thread of the plurality of conductive threads is electrically coupled to the second metal contact via a second solder joint.

9. An electronic system comprising:
   a power transmitting device to provide power, wherein the power transmitting device includes:
      a charging pad having a plurality of metal contacts; and
      a fiber device having a plurality of non-conductive threads and a plurality of conductive threads, wherein the plurality of non-conductive threads and the plurality of conductive threads are weaved to form a fabric, and wherein at least one of the plurality of conductive threads is aligned with, and electrically coupled to via a solder joint, at least one of the plurality of metal contacts; and
   a receiving device to receive power from the power transmitting device via at least a portion of the plurality of conductive threads when the receiving device is located on the fiber device.

10. The electronic system of claim 9, wherein each of the plurality of conductive threads are arranged in a first direction.

11. The electronic system of claim 9, wherein the at least one of the plurality of conductive threads includes a first portion of the at least one of the conductive threads located at a top surface of the fiber device and a second portion of the at least one of the conductive threads located at a bottom surface of the fiber device.

12. The electronic system of claim 11, wherein the second portion of the at least one of the conductive threads contacts the at least one of the plurality of metal contacts.

13. The electronic system of claim 9, wherein the solder joint includes solder paste.

14. The electronic system of claim 9, further comprising a power source, the power source electrically coupled to at least a portion of the plurality of metal contacts.

15. The electronic system of claim 9, wherein the at least one of the plurality of conductive threads includes a first conductive thread, wherein the solder joint is a first solder joint, wherein the receiving device includes a plurality of receiving conductive contacts, wherein the plurality of receiving conductive contacts are to contact the first conductive thread and a second conductive thread of the plurality of conductive threads when the receiving device is located on the fiber device, and wherein the second conductive thread is aligned with, and electrically coupled to via a second solder joint, another of the plurality of metal contacts.

16. The electronic system of claim 9, wherein the at least one of the plurality of metal contacts includes a first metal contact, wherein the plurality of metal contacts includes a second metal contact located adjacent to the first metal contact in an arrangement of the plurality of metal contacts, wherein the receiving device includes a first receiving conductive contact and a second receiving conductive contact, and wherein a distance between the first receiving conductive contact and the second receiving conductive contact is greater than a distance between the first metal contact and the second metal contact.

17. The electronic system of claim 9, wherein the plurality of metal contacts are located at a surface of the charging pad, wherein the at least one of the plurality of conductive threads is electrically coupled to the at least one of the plurality of metal contacts via the solder joint at a first surface of the fiber device, wherein the at least one of the plurality of conductive threads extends to a second surface of the fiber device, the second surface of the fiber device opposite to the second surface of the fiber device, and wherein the receiving device is to be located on the second surface of the fiber device to receive power from the power transmitting device.

18. A method of providing an electronic device, comprising:
  providing a charging pad having a plurality of metal contacts;
  providing a fabric device having a plurality of non-conductive threads and a plurality of conductive threads, wherein the plurality of non-conductive threads and the plurality of conductive threads are weaved to form a fabric; and
  providing the fabric device on the charging pad, wherein at least one of the plurality of conductive threads is aligned, and electrically coupled to via a solder joint, at least one of the plurality of metal contacts when the fabric device is provided on the charging pad.

19. The method of claim 18, further comprising:
  positioning solder material between the at least one of the plurality of conductive threads and the at least one of the plurality of metal contacts; and
  heating the solder material to produce the solder joint.

20. The method of claim 18, wherein the at least one of the plurality of conductive threads includes a first conductive thread, wherein the at least one of the plurality of metal contacts includes a first metal contact, wherein the solder joint is a first solder joint, and wherein providing the fabric device on the charging pad includes:
  aligning a second conductive thread of the plurality of conductive threads with a second metal contact of the plurality of metal contacts; and
  forming a second solder joint between the second conductive thread and the second metal contact, wherein the second solder joint electrically couples the second conductive thread and the second metal contact.

* * * * *